Aug. 25, 1970    J. C. PHILLIPS    3,525,216
FLUID MOTOR OR PUMP

Filed Aug. 2, 1967    3 Sheets-Sheet 1

INVENTOR:
JOHN CARROLL PHILLIPS
BY
Dawson, Tilton, Falloy & Lungmus
ATT'YS

Aug. 25, 1970  J. C. PHILLIPS  3,525,216

FLUID MOTOR OR PUMP

Filed Aug. 2, 1967  3 Sheets-Sheet 2

INVENTOR:
JOHN CARROLL PHILLIPS
BY:
Dawson, Tilton, Fallon & Lungmus
ATT'YS

INVENTOR:
JOHN CARROLL PHILLIPS

United States Patent Office 3,525,216
Patented Aug. 25, 1970

3,525,216
FLUID MOTOR OR PUMP
John Carroll Phillips, 2405 Texas Ave.,
Tampa, Fla. 33609
Filed Aug. 2, 1967, Ser. No. 662,258
Int. Cl. F03g 7/06
U.S. Cl. 60—24                                    31 Claims

ABSTRACT OF THE DISCLOSURE

A mechanism which is useful for transforming various forms of energy into rotary motion, linear motion, or both, and which is also useful as a pump to transfer liquids and gasses, or as a compressor to compress gasses. The mechanism includes a rotor defining a surface of revolution generated by revolving a line about its axis or a plurality of intersecting major and minor surfaces or teeth inclined with respect to this surface of revolution, a reciprocator (in certain embodiments) or a housing (in other embodiments) defining a matching surface of revolution or matching teeth inclined to this matching surface of revolution, and a return means for moving the rotor or the rotor and reciprocator along and about substantially coincident axes. Communicating passages in the rotor and housing (or reciprocator) carry the working fluid to and from variable volume chambers disposed between the teeth of the rotor and those of the reciprocator (or housing), and help control the momentum of the working fluid as they move in and out of register with each other and change the direction of its flow. When the working fluid is moved through the passages and between the matching teeth, under pressure or expanded in the variable volume chambers between such teeth, the mechanism serves as a motor, and when it is driven (by an external driving means) the mechanism serves as a compressor or pump. With both functions combined in a composite machine, along with heating and cooling means to further control the momentum of the working fluid, a heat engine is obtained.

BACKGROUND

Numerous rotary mechanisms have been proposed and built that can be adapted for use as an engine, or as a pump, or as a compressor, but with the exception of the radial plunger, orbital piston and swash-plane types excessive leakage, due to wear, is a major problem. In other types the mating surfaces meet at a line or lines and no satisfactory method of packing has been developed to compensate for wear along such surfaces. Another major problem in the efficient handling of expansible working fluids is to provide multiple stages of compression, expansion, or both, with cooling or heating, and with short communicating passages, between stages.

Open cycle reaction engines use the change in momentum obtained from heating gasses to high temperature in a combustion chamber and exhausting them through a nozzle at a high velocity to produce the reaction force required for propulsion. Characteristically, such engines have the disadvantage of providing relatively low propulsive efficiency unless they are moved or moving at high speeds.

SUMMARY OF THE INVENTION

The structure of the invention comprises a simple and highly efficient combination of a rotating member, a fixed or reciprocating member and an axial return means that together move a working fluid between their cooperating end surfaces and through their passages as they are moved relative to each other, or that are themselves moved relative to each other when a working fluid is forced between their cooperating end surfaces and through their passages. Where the combination is used to move the working fluid, it may serve as a pump or compressor, and where it is instead moved by the working fluid, it can be used as a motor. Furthermore, where both functions are included in one machine and the working fluid is heated and cooled, the combination constitutes a heat engine. The mechanism of the invention is therefore useful in a multiplicity of applications such as, for example, heat pumps and mechanical refrigeration equipment, air compressors and air motors, power transmission, hydraulic pumps and motors, propulsion and braking systems, and internal and external combustion engines.

Another aspect of the invention lies in providing a compact heat engine that will develop high torque at low shaft speed and that can compress an expansible working fluid in multiple stages so minimum work is expended, and expand an expansible working fluid in multiple stages so maximum shaft work is obtained.

A further aspect of the invention is to provide a heat engine that can control the rate of change of momentum of its working fluid and exhaust gasses to obtain a reaction force, a resultant force, or both, to produce a resultant force that can be used for propulsion or braking and, a simple means of directing this force.

All of the constructions embodying the invention are characterized by having a relatively small number of parts and, in particular, in having a limited number of moving parts. Variable displacement and large output per unit volume and unit weight can be incorporated in all embodiments. When two units are used, the reciprocating parts are in opposite phase relation to each other so that dynamic balance is maintained and a short stroke minimizes inertial effects.

In its various applications, the structure of the present invention obviates the problem of line contact between engaging surfaces by substituting surface contact of the mating parts, thereby allowing the use of conventional packings and adjustments to confine the working fluid and compensate for wear.

DESCRIPTION

In all of the forms of the invention shown a surface of revolution is formed on the end of a rotor, and a housing, or a reciprocator, and in certain forms of the invention teeth or blades are attached to or integrally formed on these surfaces of revolution. The surface of revolution, or the surface formed by the teeth on such surface of revolution, is referred to herein as an end surface, and the teeth are referred to as end teeth. The particular surface of revolution, tooth form, tooth size and number of teeth, depend on the working fluid selected and the use requirements of the mechanism.

Furthermore, in all embodiments of the invention shown and disclosed herein there are at least a pair of members having cooperating and surfaces and such members are mounted for movement towards and away from each other as one of the members rotates.

Figures 1, 2, 3, 4, 5:
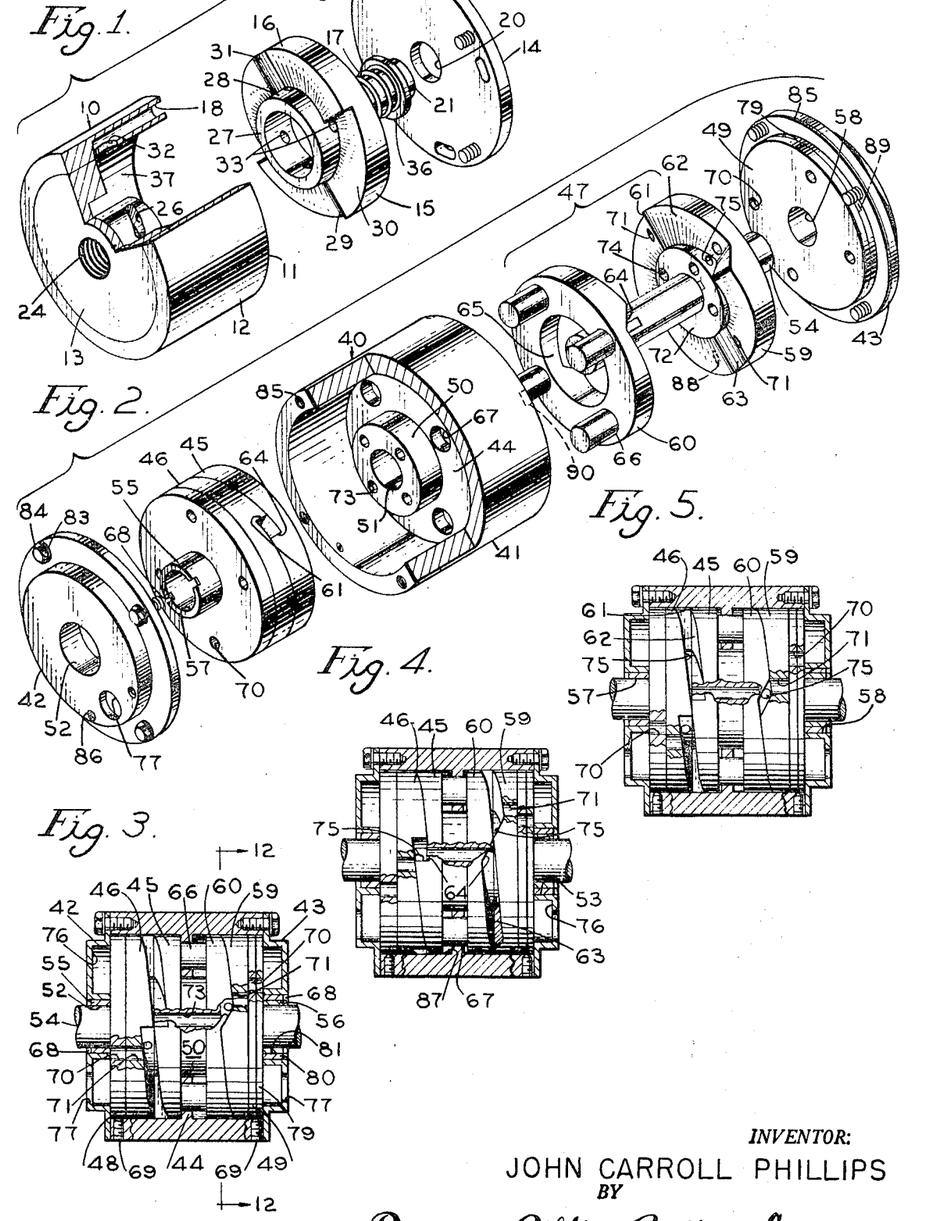
FIG. 1 is an exploded perspective view, partly broken away, and illustrating one embodiment of the invention.
FIG. 2 is an exploded perspective view, broken partly away, illustrating a second embodiment of the invention.
FIG. 3 is a front elevation shown partly in section of the mechanism of the second embodiment, the rotary and reciprocating members being viewed near the beginning of intake and exhaust cycles.
FIG 4 is similar to FIG. 3 but illustrates the relative positions of the parts at the beginning of compression and expansion cycles.
FIG. 5 is similar to FIGS. 3 and 4 but shows the positions of the parts near the end of the compression and expansion cycles.
Figure 6:
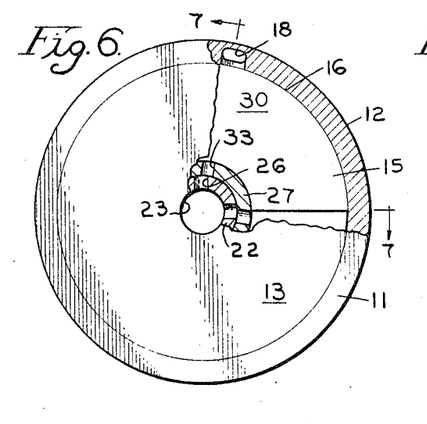
FIG. 6 is an end elevational view shown partly in section and taken along line 6—6 of FIG. 7.
Figure 7:
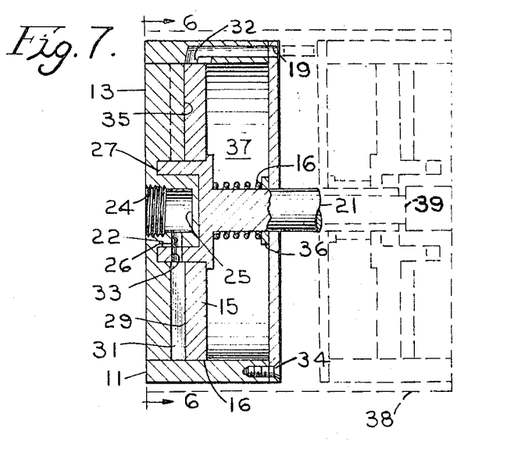
FIG. 7 is a longitudinal cross sectional view of the embodiment illustrated in FIG. 1 and taken along line 7—7 of FIG. 6; this view also shows two embodiments joined together in an auxiliary housing, represented by dotted lines.

Referring now to the first embodiment of the invention illustrated in FIGS. 1, 6, and 7, the mechanism is generally designated by the numeral 10 and essentially comprises a housing 11, a rotor 15, and return means 17 for moving the rotor along its axis in a reverse direction at the end of each cycle. In the illustration given, the housing is generally cylindrical in shape, defining a cylindrical chamber 37 therein, and is composed of three parts. One part consists of the cylindrical side wall 12 which, as shown in the drawings, is provided with a plurality of axially extending passages 18. Only one such passage is clearly illustrated in the drawings; however, it is to be understood that such passages are uniformly spaced about the circumference of side wall 12 and their number corresponds with the number of teeth provided by rotor 15.

End walls or covers 13 and 14 constitute the remaining parts of the housing. Cover 14 closes off one end of the housing and is secured to cylindrical side wall 12 by means of screws 34 or by any other suitable means. Axial passages 19 extending through cover 14 adjacent the periphery thereof communicate directly with passages 18, and a central opening 20 rotatably and slidably receives rotor shaft 21.

End wall 13 at the opposite end of the housing is permanently secured to side wall 12 and is provided with an inwardly-projecting sleeve portion 22. Referring to FIGS. 6 and 7, it will be observed that the sleeve portion has an axial bore 23 which may be internally threaded at 24 for attachment to a suitable fluid conduit (not shown). The sleeve is closed at its inner end by end wall 25, but a plurality of ports or orifices 26 extend radially outwardly through the sleeve's side wall. Such ports are uniformly spaced about the circumference of the sleeve and correspond in number to the passages 18 provided in side wall 12; however, as illustrated in FIG. 6, such ports are not in radial alignment with axial passages 18.

Rotor 15 includes an annular hub 27 which rotatably receives the sleeve portion 22 of the housing. In the illustration given the hub 27 and rotor shaft 21 are formed integrally and the outer portion of the rotor 15 is formed as a separate part which is fixed to the hub. It is to be understood, however, that the outer portion of the rotor, the hub, and the shaft may all be integrally formed, or may be made as separate components later fixed together in any suitable manner.

The outer portion of rotor 15 has an end surface which faces the end wall 13 of the housing and which is provided with a plurality of end teeth 29. A total of four of such teeth are shown in FIG. 1 but it is to be understood that a greater or smaller number may be provided. Each tooth has a major or sealing face 30 inclined with respect to a surface of revolution generated by a line revolved about the axis of the rotor (and thus, in the illustration given, the line is straight and perpendicular to the rotor's axis), and a minor or working face 31 which intersects a sealing face to form the peak of a tooth and the surface of revolution to form the valley of a tooth. The inner limit of each tooth is defined by the outer surface 28 of the hub, which may be referred to as the axial surface, and the outer limits of each tooth is defined by the outer or peripheral surfaces 16 of the rotor.

The working face of each tooth is shown as a plane surface to simplify the drawings but in many cases it would be advantageous to make them curved surfaces. Certain end surfaces with curved working faces can be cut on the end of a solid of revolution by rotating it about its axis while moving it back and forth along this axis relative to a form cutter rotating about a transverse axis. Moving the form cutter back and forth along its axis in phase with the back and forth movement of the cylinder along its axis would cut spiral teeth. Different shape form cutters will determine the form of different solids of revolution and can be used to cut torroidal, spheroidal, cylindrical, conical, and other forms.

The surface of the end cover or end wall 13 of the housing which faces the rotor is provided with a plurality of teeth 35 which in form, position, and size are the mirror images of the teeth 29 of the rotor. Thus, the opposing teeth of rotor 15 and end wall 13 are complimentary and the respective sealing and working surfaces thereof may be interfitted in one position of rotation of the rotor so that no appreciable spacing exists between the end faces of the respective parts. FIGS. 6 and 7 show the rotor moved slightly from this position.

The chamber 37 of the housing is of an axial dimension sufficient to permit limited axial movement of the rotor 15 therein. Specifically, the length of the chamber must be great enough to permit axial displacement or movement of the rotor a distance equal to the axial dimension of teeth 29 and 35. When the parts are assembled as illustrated in FIGS. 6 and 7, return means 17 in the form of a helical spring and thrust bearing 36 are interposed between the rotor and end cover 14 to urge the rotor towards end wall 13 and maintain the sealing faces of the teeth 29 and 35 in mutual contact. Also, as indicated in FIGS. 6 and 7, the rotor is dimensioned so that its peripheral surface 16 sealingly engages the inner cylindrical surface of housing side wall 12.

It is believed evident from the foregoing that the rotor is capable of reciprocation as well as rotation. Upon rotation of the rotor in counterclockwise direction and as viewed in FIG. 1, and from a position of almost complete intermeshing engagement of the rotor and housing teeth (FIG. 7), the sealing faces of the respective teeth 29 and 35 slide upon each other and the working faces of the teeth of the respective parts move angularly apart to define (along with the inner cylindrical surface of the housing and the axial surface 28 of the rotor) variable volume chambers of increasing size. Finally, when the rotor 15 has rotated an angular distance equivalent to the angular dimension of each of its teeth 29 (and of teeth 35), each variable volume chamber has reached its maximum volume. As the peaks of the respective teeth 29 and 35 pass each other, the axially displaced rotor is returned to its original position by return spring 17 and the variable volume chambers again approach zero or negligible volume.

Referring to FIGS. 1 and 7, it will be observed that housing passages 18 communicate with the interior of the housing through radial ports 32 adjacent the peaks of teeth 35 of end wall 13. Since return means 17 urges the rotor axially to maintain the sealing faces of the sets of teeth 29 and 35 in mutual contact, ports 32 can communicate with the variable volume chambers between the respective teeth only during the interval at the end of each operative cycle when spring means 17 shifts the rotor back into its initial position before the start of a new cycle. At this time the working fluid is discharged from these chambers through ports 32 and passages 18 and 19 as spring 17 shifts the rotor axially. A heavy or weighted rotor with a vertical axis can be shifted axially by the force of gravity instead of the spring when desirable.

In the hub portion 27 of the rotor, and extending through the axial surface 28 thereof adjacent the intersection of sealing and working faces 30 and 31 of each tooth, are a plurality of ports 33 (FIG. 1). These ports of the rotor are in direct communication with ports 26 of housing sleeve 22 at the commencement of each operative cycle, that is, when the rotor has been returned to a starting position by return spring 17 (FIGS. 6 and 7). It will be noted from FIG. 1 that ports 26 may be angularly elongated in directions generally parallel with the sealing faces of the teeth 29 and 35 adjacent thereto, the extent of elongation determining the angular extent of communication between ports 26 and 33 during operation of the mechanism.

When the mechanism is operated as a simple hydraulic motor, working fluid is introduced into the mechanism through opening 23, such fluid being delivered under pressure from a suitable source (not shown). With the parts of the mechanism in the relative positions illustrated in FIGS. 6 and 7, the working fluid flows radially through ports 26 and 33 to force the working faces of the sets of teeth 29 and 35 apart. Since the expansive forces of spring 17 is greater than the maximum axial force applied by the working fluid against sealing faces 30, and since the rotor is freely rotatable, the pressure fluid forces the rotor to rotate in a counterclockwise direction as viewed in FIG. 1. As the sealing faces of the opposing teeth slide over one another, the working faces provided by the opposing sets of teeth move angularly apart and the size of the variable volume chambers between the opposing sets of teeth increases. Finally, when the rotor has rotated an angular distance equal to the angular dimensions of each of its teeth, the sealing surfaces of the teeth of the respective parts pass out of contact, ports 32 communicate with the spaces between the teeth to permit the discharge of fluid outwardly and then axially through ports 32 and passages 18 and 19, as spring means 17 shifts the rotor axially into position for the start of a new cycle.

This motor would be more applicable to driving loads requiring a combination of rotary and reciprocating motion or reciprocating motion, however, if the mechanism is mounted for rotation about an axis substantially coincident with the axis of shaft 21 the reaction torque acting on the working faces of teeth 35 will rotate the mechanism and a load operatively associated with it in a clockwise direction as the load operatively associated with drive shaft 21 is rotated in a counterclockwise direction.

When the load operatively associated with drive shaft 21 is the compressor of a heat engine it would be desirable to construct a unit which consists essentially of joining two mechanisms shown in FIG. 1 together and rotatably mounting them in a cylindrical housing with a transverse partition having a central aperture and arcuate ported working fluid passages, as indicated by dotted lines 38 in FIG. 7. Two units can be mounted and joined together in the following manner: drive shaft 21 would have a rotor 15 and hub 27 rigidly attached to each end and is journaled in the central aperture of the housing, end walls 25 would be rigidly attached by member 39 rotatably disposed in the cylindrical bore of shaft 21; end plates 14, springs 17, screws 34 and thrust washers 36 could be used or omitted, and the angular location of the working faces of teeth 29 and 35 relative to the working fluid passages and their inclination would correspond substantially with those shown in FIG. 2. This combination would be analogous to the embodiment shown in FIG. 2 and can be modified in similar ways so a working fluid will follow substantially the same cycles described in regard to this embodiment or its modifications.

The embodiment illustrated in FIGS. 2 through 5 is similar in basic function to the structure already described except that alternate forms of return means and passage location are provided, and the rotor and rotor shaft do not reciprocate. The reciprocating and rotating operations are performed by separate elements and, in the preferred embodiment shown, the return means utilizes two end surfaced members. However, when it is desirable to balance the axial thrust of the working fluid on the reciprocator or aid the rotor in returning the reciprocator assembly an expansible means can be used alone or in combination with the end surfaced members to compose the return means. This can be accomplished by helical springs between the reciprocators and the transverse partition of the housing, by air cushions formed in annular chambers 87 between the reciprocator and the transverse partition of the housing, or by other suitable means.

Referring to FIG. 2, the structure essentially comprises a housing generally designated by the numeral 40, a reciprocator 45, a rotor 46, and return means 47. Adjustable end plates 48, 49 and 79 are also provided for helping control the momentum of working fluid and its flow during operation of the mechanism, as will be brought out more fully hereinafter.

Housing 40 has a generally cylindircal side wall 41 closed at its ends by end walls 42 and 43. Disposed within the housing at a point intermediate the length thereof is a transverse partition 44. Extending through the partition, and projecting axially from both sides thereof, is a central sleeve member or portion 50 of reduced diameter. Portion 50 and partition 44 are illustrated as formed integrally and it is to be understood that, if desired, such parts may be separate components rigidly secured together. Vents through side wall 41 or transverse partition 44 will be required with certain working fluids and return means and would be placed in accordance with established practice.

Sleeve portion 50 and end walls 42 and 43 are centrally apertured at 51, 52 and 53, respectively, for rotatably receiving an elongated rotor shaft 54. In the form illustrated, openings 52 and 53 are of substantially larger diameter than the rotor shaft to receive the outwardly projecting collar portions 55 and 80 of centrally apertured end plates 48 and 79, and opening 81 rotatably receives outwardly projecting collar portions 56 of centrally apertured end plate 49. The central portion of the rotor shaft is journaled in opening 51 and the end portions of the rotor shaft rotate in the openings 57 and 58 of these collar portions. End walls 42, 43 and shims 85 are secured to housing 41 by bolts 84 and washers 83 or by other suitable means.

The end surfaces of rotors 46 and 59 and reciprocators 45 and 60 can be made substantially identical or the angle between the working faces and the surface of revolution can be changed so suit the working fluid and the use requirements of the mechanism. A variation of this angle is shown between the pairs of cooperating and surfaces to denote this possibility and visually differentiate between the expansion and compression sections of an engine in the drawings.

Each of the rotors has an end surface provided with a plurality of end teeth 61. Each of the arcuate teeth is substantially identical in configuration to the teeth 29 of the first embodiment; thus, each tooth 61 is defined by a sealing face 62 and a working face 63. However, unlike the first embodiment where the complementary teeth 35 are provided by the end wall 13 of the housing, in the embodiment of FIGS. 2–5 the complementary teeth 64 are provided by reciprocators 45 and 60. The end surface formed by teeth 61 of rotor 59 therefore mate, or are capable of mating, with the end surface formed by complementary teeth 64 of annular reciprocator 60, and the end surface formed by teeth 61 of rotor 46 are capable of mating with the end surface formed by complementary teeth 64 of annular reciprocator 45.

Rotors 59 and 46 are keyed or otherwise securely fixed to rotor shaft 54 on opposite sides of partition 44. Reciprocator 45 is interposed between rotor 46 and partition 44 and, similarly, reciprocator 60 is interposed between rotor 59 and the partition. Enlarged openings 65 in each annular reciprocator slidably receive an axially extending portion of the central sleeve 50, and a plurality of axially extending connecting elements 66 extend through openings 67 in the outer portion of the partition to operatively interconnect the two reciprocators 45 and 60. Since in most instances the connecting elements 66 are positively joined to both reciprocators 45 and 60 with an interference fit or other suitable means in a fully assembled mechanism, the connecting elements not only join the reciprocators for simultaneous operation but also prevent rotation of the reciprocators within the housing without preventing axial movement or reciprocation thereof. Rotation can be prevented by other suitable means such as the rollers shown in FIGS. 9 and 13 plain or ball bearing splines, torsion springs, etc.

It will be noted in FIG. 3 that the length of connecting elements 66 exceeds the thickness of partition 44. It is important that this difference in axial dimensions be no less than the maximum axial dimension of the teeth 61 of rotors 46 and 59. When the parts are fully assembled as shown in FIG. 3, rotors 46 and 59 are mounted upon shaft 54 at a distance which just barely permits independent rotation of one rotor (with respect to its adjacent reciprocator) when the other rotor has its teeth fully mated with those of the reciprocator immediately adjacent thereto.

As previously indicated, end plates 48, 49 and 79 are selectively rotatable within the housing for purposes of flow control. To facilitate such rotatable adjustment, the ends of collars 55, 56 and 80 may be notched at 68 to accommodate a suitable adjustment tool or altered so they can be attached to a suitable linkage. Set screws 69 extending through the side wall 41 of the housing and in certain embodiments through fixed annular portion 78 of the end plates 48 and 49 may be rotated into frictional engagement with the rotatable portion of end plates 48 and 49 to hold them in any selected positions of adjustment.

Each end plate is provided with concentric series of equally radially spaced axial passages 70, the number of equally spaced radial lines corresponding with the number of teeth of each rotor. Each end plate has an equal number of complementarily spaced passages and end plate 79 has some extending into arcuate slots. Similarly, each rotor 46 and 59 has an equal number of complementarily spaced axial openings 71 which register with the openings 70 of the adjacent end plate when each rotor is rotated into proper position. Ports of passages 71 open into the sealing faces 62 of the teeth of each rotor in close proximity to the junctions between such sealing faces and working faces 63 but are not limited to this position. For example, with certain working fluids and where variable displacement is not necessary, end plates 48, 49 and 79 can be omitted and the passages moved from the position indicated by 71 to the positions indicated by 88.

Each of the rotors 59 and 46 has a central hub portion 72 which provides a flat inwardly facing surface adapted to bear against an end surface of the housing's central sleeve portion 50. As seen most clearly in FIG. 2, the central sleeve portion 50 has a plurality of flow passages 73 extending longitudinally therethrough, and the hub portion of each rotor is provided with passages 74 adapted to register and communicate with the passages of the sleeve portion. The number of such passages 73 and 74 in each of the respective parts corresponds with the number of teeth provided in each of the substantially identical rotors. Each passage 74 in the hub of a rotor extends axially and then radially or tangentially outwardly, opening into the valley defined by surfaces 62 and 63. Thus, as shown in the right hand rotor of FIG. 2, passages 74 terminate in ports 75 in the valleys of teeth 61.

Each end wall 42 and 43 of the housing 40 is provided with an internal annular recess 76 which constitutes a manifold chamber for the distribution of fluid flowing into or out of the operating mechanism of the unit. For the purpose of introducing or withdrawing fluid from such manifolds, the end walls are provided with openings 77. Threaded openings 86 are adapted to receive the screws of a suitable coupling (not shown) so that supply and exhaust conduits may be joined to the end walls and will communicate with the manifold chambers. Also, the output manifold chamber can be designed so the output can be delivered to the common port shown or the delivery of one or more teeth may be transmitted independently to separate ports.

When changes in the use requirements and working fluid are made, the fluid passages will be subject to design changes as well understood by those skilled in the related arts. For example, the tooth form and passages would be designed to utilize the force resulting from the change of direction or rate of flow of the working fluid in the fixed and moving members, as is done in a turbine, the addition of insulation and surfaces for heating and cooling the working fluid in the passages, as is done in heat exchanges and regenerators, and the timing of the register of the moving and fixed passages and the modification of the ports in area and shape, as is done in rotary hydraulic pumps and motors.

The operation is illustrated somewhat schematically in FIGS. 3 through 5. Assuming that the mechanism is to be operated as a heat engine and the working fluid can be heated and cooled, as is brought out in detail hereinafter, rotor 46 and reciprocator 45 comprise the expansion or motor section of the engine, and the return means 47 (rotor 59 and reciprocator 60) constitutes the pump or compression section. Working fluid enters the compression section of the engine through right inlet 77, manifold 76, end plate passages 70, and rotor passages 71 when the end plate and rotor passages are partially in register, as illustrated in FIG. 4. At the stage of the operating cycle shown in FIG. 4, working fluid has been drawn into the variable volume chambers between the end teeth of rotor 59 and reciprocator 60, as rotor 59 has rotated in a counterclockwise direction (as viewed from the left) and has cammed reciprocator 60 towards the left to substantially the full extent of its stroke, the compression chambers between the opposing teeth of rotor 59 and reciprocator 60 are at maximum volume, and the flow communication between end plate passages 70 and rotor passages 71 is about to be interrupted. The working fluid cannot escape from the compression chambers because ports of passages 74 in the hub of the rotor do not as yet register with the axially-extending passages 73 in the central sleeve portions 50 of the housing.

Continued rotation moves the rotor into the position illustrated in FIG. 5 where it will be seen that the passages 70 and 71 of the end plate and rotor are out of registry, and outlet ports of passages 74 in the hub of the rotor now communicate with passages 73 in the central sleeve portion 50. Working fluid previously disposed in the compression chambers between the end surfaces of rotor 59 and reciprocator 60 has been compressed and discharged axially from ports of passages 74 and into passages 73. Continued rotation moves the rotor into the position illustrated in FIG. 3 where it will be seen that passages 74 in the hub of the rotor are out of registry with passages 73 and the working fluid is compressed in passages 73 where it is heated, as will be brought out in detail later. Reciprocator 60 is then in a position wherein its end teeth fully mate with the teeth of rotor 59. In other words, the variable volume chambers between the end teeth of reciprocator 59 and rotor 60 now assume their smallest volume.

It should be noted that if the end surfaces of rotor 59 and reciprocator 60 are defined as a surface of revolution instead of a plurality of end teeth the working fluid would also be compressed in passages 73 and the chamber between them would assume its smallest volume at this position. The remaining compressed working fluid between these end surfaces and other expansible means would then act as the return means instead of the camming action of the end teeth as brought out hereinafter.

The action of compression rotor 59 is synchronized with the action of expansion rotor 46 because both rotors are fixed to the same rotor shaft 54, and when the mechanism is in the stage of its cycle of operation illustrated in FIG. 3 the working fluid disposed between the opposing end faces of expansion reciprocator 45 and expansion rotor 46 has reached a maximum stage of expansion. At the instant illustrated in FIG. 3, the expanded gas, sealed within the expansion chambers between the opposing teeth, is ready to be exhausted by reciprocator 45, connecting elements 66, and compression reciprocator 60 just as soon as the slidably engaging teeth of rotor 46 and reciprocator 45 clear each other and permit full mating of parts 45 and 46. In FIG. 4, such mating has occurred and the entire reciprocator assembly (i.e., reciprocators 45 and 60, and connecting elements 66) has been moved to the left by the camming action of compression rotor 59 transmitted through a compressed layer of the working fluid to compression reciprocator 60. The expanded working fluid, having performed its intended function, was discharged through aligned passages 71 and 70 of expansion rotor 46 and end plate 48, respectively, into manifold 76 of end wall 43 and through discharge port 77.

After the used working fluid is discharged, the parts are in the relative positions shown in FIG. 4 with passages 70 (in end plate 48) and 71 (in rotor 46) out of register and passage 74 in rotor 46 beginning to register with passage 73 in sleeve 50. The heated working fluid then flows from passages 73 between the end surfaces of rotor 46 and reciprocator 45 and expands to force the working faces of sets of teeth 61 and 64 apart. This rotates the rotor 46 in a counterclockwise direction (as viewed in FIG. 2) until passages 70 (in end plate 48) and 71 (in rotor 46) are in register. The cycle is then repeated.

This mechanism may also be operated as a heat pump by rotating shaft 54 by suitable means (not shown) and cooling the working fluid in passages 73 instead of heating it as previously mentioned. The expanding working fluid would be cooled further while doing work on shaft 54 and could be used directly for cooling as it leaves the left opening 77, or be circulated through cooling coils and returned to the right opening 77 if a closed cycle is required. The heat obtained in cooling the working fluid in passages 73 could be used for heating.

The amount of working fluid drawn into the chambers between the end teeth of rotor 59 and reciprocator 60 depends on the size of the chamber when passages 70 in end plate 49 and passages 71 in rotor 59 are in register. The size of the chamber and the displacement of the engine is maximum when the end plate is in the position shown in FIGS. 3 through 5, and would decrease as the end plate is rotated in a counterclockwise direction as viewed in FIG. 2. The output of the engine and its displacement can be fixed in any selected position by set screw 69 or changed continuously by rotating collar 56. End plate 79 also helps determine the flow of the working fluid through passages 70 in end plate 49. When end plates 49 and 79 have an equal number of complementarily sized and spaced passages 70 the flow will be stopped by rotating collar 80, or when some of the passages in end plate 79 are extended into arcuate slots the flow will continue through these passages while being stopped from flowing in others. This allows for the control of the flow through certain passages without affecting the flow through others. Additional end plates can be included to obtain any desired flow control.

FIG. 5 illustrates the parts at a late stage in the compression and expansion cycles, both of the expansion and compression chambers defined by the opposing surfaces of expansion rotor 46 and expansion reciprocator 45 on one hand, and by passages 73, compression rotor 59 and compression reciprocator 60 on the other, being sealed against the inflow and outflow of working fluid.

Figures 11, 12:
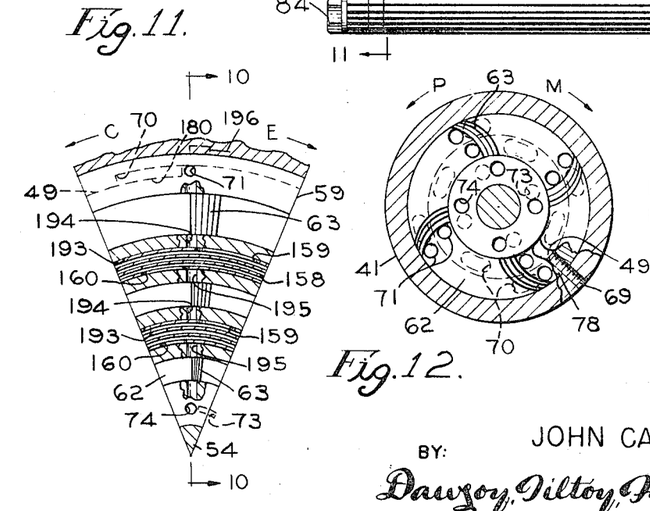
FIG. 11 is a fragmentary sectional view taken substantially along line 11—11 of FIG. 10 with the reciprocator removed and the rotor partially broken away to show its passages in relation to the between-stage housing passages. This view also shows the relation of one group of rotor passages to one group of fixed passages and the passages in the porting plate and the transverse partition of the housing are diagrammatically represented by dotted lines on the face of a rotor.
FIG. 12 is a transverse cross sectional view taken substantially along line 12—12 of FIG. 3, the reciprocator being removed and partially broken away to show the fixed and movable parts of an end plate and also showing the relation of one group of rotor passages to one group of fixed passages in the end plates and transverse partition of the housing, diagrammatically represented by dotted lines on the face of a rotor showing a slightly different tooth form.

The operation of the mechanism as a simple hydraulic motor is best illustrated by FIGS. 3 through 5, and by FIG. 12. When the parts of the mechanism are in the relative positions illustrated in FIG. 3, the ports of passage 73 in sleeve 50 and passages 70 in end plates 48 and 49 are in the positions diagrammatically represented by dotted lines on the end surface of a rotor in FIG. 12. If the rotor is a compressor or pump rotor 59, the ports of its passages move relative to the dotted ports in the direction indicated by the arrow marked P, and if the rotor is an expansion or motor rotor 46 its ports will move relative to the dotted ports as indicated by the arrow marked M. Working fluid is introduced into the mechanism through the left opening 77, such fluid being delivered under pressure from a suitable source (not shown) into the left manifold 76. With the parts of the mechanism in the relative positions shown in FIG. 4, passages 74 in rotor 59 are out of register with passages 73 in the housing, and the working fluid begins to flow through passages 70 in fixed portion 78 of end plate 48 to force the working faces of sets of teeth 61 and 64 apart. Since the axial movement of the reciprocator assembly is limited by the end surfaces of rotor 59 and reciprocator 60, and since the rotor is freely rotatable, the pressure fluid forces rotor 46 to rotate in a clockwise direction as viewed in FIG. 12. When the outer radially spaced passages 70 and 71 are out of register, the inner radially spaced passages 70 and 71 then begin to register and the rotor continues to rotate to the position shown in FIGS. 3 and 12. Working faces of teeth 63 of rotor 59 then transmit pressure through a layer of working fluid to the working faces of teeth 64 of reciprocator 60 as rotor 59 cams the reciprocator assembly (parts 45, 60 and 66) axially to the position illustrated in FIG. 4. Since passages 74 in rotors 46 and 59 are in register with passages 73 in sleeve 50, the reciprocator assembly transfers the working fluid to the chambers between the end surfaces of rotor 59 and reciprocator 60 as it moves axially. At the end of this transfer cycle, passages 74 in rotor 46 and passages 73 in sleeve 50 are out of register and the inner radial spaced passages 71 in rotor 59 are in register with the inner radial spaced passages 70 in end plate 49. As working faces 63 rotate, they force the working fluid through these passages into the right manifold 76 until they are out of register and then through the outer radial spaced passages 71 and 70 until they are out of register as is shown in FIG. 12. The parts of the mechanism are then in the relative positions shown in FIG. 3 so the cycle can be repeated.

This mechanism may also be operated as a pump by rotating shaft 64 by suitable means (not shown). The working fluid is drawn through left opening 77, manifold 76, and passages 70 and 71 into the chamber between the end surfaces of rotor 46 and reciprocator 45, instead of being forced under pressure as mentioned in the operation of the motor. The transfer of the working fluid from the chambers between the end surfaces of rotor 46 and reciprocator 45 to the chambers between the end surfaces of rotor 59 and reciprocator 60, the positions of the passages, and the pumping action of these end surfaces, would be substantially the same as mentioned in the operation of the motor.

The operation of air motors and compressors would be similar to the operation of hydraulic motors and pumps. When an expansible working fluid is used the admission and cutoff would be determined by the position of end plate 48. Motor and engine rotors with insufficient inertia will need flywheels to return the rotors to the position required to start the next cycle. Displacement of motors and pumps can also be varied by rotating the end plates. To rotate the end plates altogether, collar portions 51 and 52 can be connected by suitable means.

Figures 8, 9:
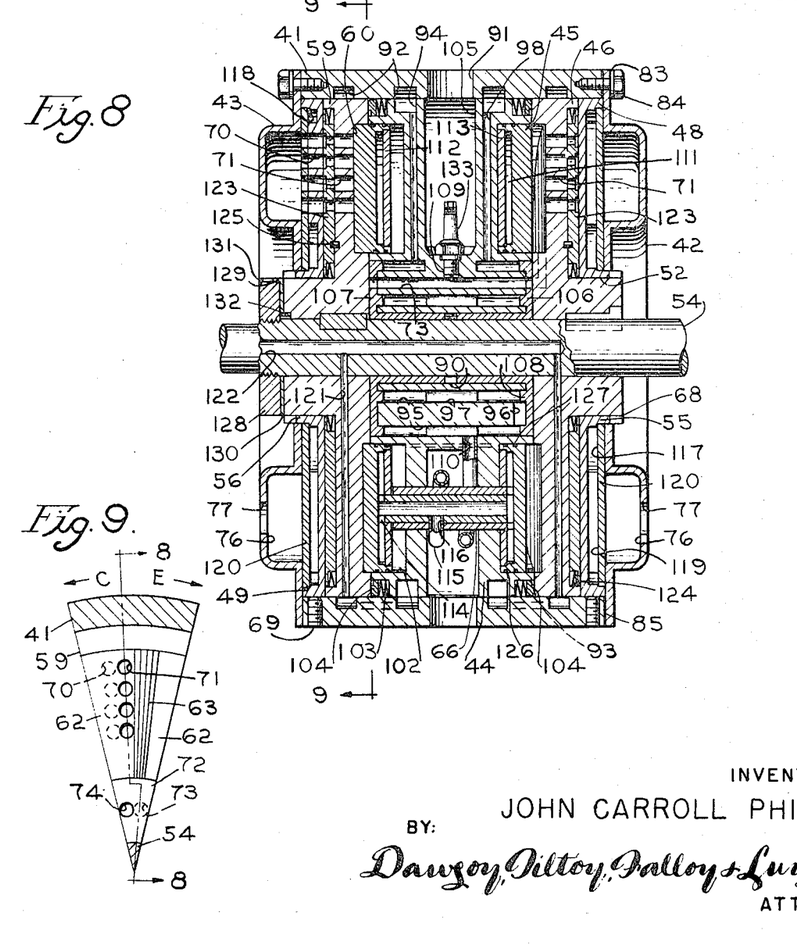
FIG. 8 is a longitudinal cross sectional view through a rotary internal combustion engine comprising a third embodiment of the present invention, certain members being revolved into the plane of the drawing for clarity of illustration.
FIG. 9 is a fragmentary sectional view taken substantially along line 9—9 of FIG. 8 with the reciprocator removed and showing the relation of one group of rotor passages to one group of fixed passages in the end plates and transverse partition of the housing, diagrammatically represented by dotted lines on the face of the rotor.

In the form of the invention shown in FIG. 8, the main distinguishing features over the previously-described embodiments are internal means for heating the working fluid, a coolant circulating system for cooling the working fluid, and additional packings and axial adjustments.

Referring to FIG. 8, the cylindrical wall 41 of the housing has formed therein central radial access openings 91 and annular coolant recesses 92 which communicate through a plurality of axial passages 93. The transverse partition 44 is joined to cylindrical wall 41 by means of an interference fit or by other suitable means so that its peripheral annular coolant recesses 94 communicate with annular recesses 92. Annular coolant recesses 95 are formed in the end faces of partition 44 and communicate with each other through a plurality of radial slots 96 and axial passages 97 and with annular recesses 94 through a plurality of radial passages 98. Annular recesses 102 and 103 mount and guide reciprocators 45 and 60 and face seals 104, respectively. Annular recess 105 is formed in the midsection of transverse partition 44 and communicates with axial passages 73 through radial threaded passages 109 and with annular recesses 95 through radial passages 110.

Flanged bushings 106 and 107 are formed so annular ridges 108 on the rear face of the radial flanges are in sealing engagement with the cylindrical surfaces of annular recesses 95, and the annular sleeve portion is applied in bore 90 with an interference fit. Annular sleeve portions constitute journal bearings for shaft 54 and the front faces of the radial flanges are grooved to provide suitable oil passages and form thrust bearing surfaces for the rotor assembly. Passages through these flanges are in register with passages 73 and form their ports.

Reciprocators 45 and 60 are provided with annular coolant recesses 111 in which left and right annular back plates 112 and 113 are rigidly attached by an interference fit or by other suitable means. Connecting elements 66 consist of inner and outer tubular sections, the inner section being rigidly attached to plate 112 and the outer section being rigidly secured to plate 113. Slots 114 in the end of connecting elements 66 permit the coolant to flow in the central passage of the inner section. The cylindrical ends of flexible conduit 115 are in sealing engagement with radial passage 116 in connecting element 66 and with passage 110 in partition 44. Conduit 115 prevents relative axial movement of the inner and outer sections of connecting elements 66, and its central passage communicates with the central passage of elements 66 and annular recesses 95.

End plates 48 and 49 have a plurality of radial coolant passages 119 connecting inner and outer annular coolant passages 117 and 118 in which end back plates 120 are rigidly attached by an interference fit or by other suitable means.

Rotors 46 and 59 and drive shaft 54 have a plurality of radial coolant passages 121 that communicate with passage 122 in the center of shaft 54 and with annular recesses 92 in the housing to form impellers that circulate the coolant through the system.

External members (not shown) would include flexible conduits in sealing engagement with radial passages 116 in connecting elements 66 communicating with the annular recesses 118 in end plates 48 and 49. The inner annular recesses 117 would be connected by a suitable conduit to a radiator which in turn would be connected by a suitable conduit and connector to drive shaft 54 to complete the circuit. A fan would be connected to shaft 54 to circulate air over the engine and through the radiator. Internal baffles and seals or packings to keep the system coolant-tight would be included between the various members in accordance with conventional practice. If desired, air cooling may be used on small engines by providing suitable finning and baffles.

Leakage between rotors 46 and 59 and the transverse partition 44 is prevented by suitable sealing means such as the mechanical face-type seal assemblies represented generally by numeral 104. In such a seal, the metal bellows is in sealing engagement with partition 44 and with the annular ring that bears against the inner face of the rotor. Other seal assemblies generally indicated at 123 limit the leakage between the end plates and the outer rotor faces. In seals 123, two metal bellows are in sealing engagement with the cylindrical surfaces of annular recesses 124 in rotors 46 and 59 and with annular plate. Pins 125 in each rotor lock the annular plates of each seal assembly 123 against relative rotation with respect to the adjacent rotor while at the same time permitting relative axial displacement of the plates. Each annular plate has a plurality of passages in register with passages 71 of the adjacent rotor. Piston rings 126 are in sealing engagement with the cylindrical surfaces of annular recess 102 and limit leakage between the reciprocators and these surfaces. In the illustration given, such rings fit in suitable grooves 127 in reciprocators 45 and 60. Axial clearance can be adjusted by a threaded lock nut 128 that fits peripherally threaded shaft 54 and is held in position by tab 129 of lock washer 130 in one of its plurality of notches 131. Lock washer 130 is held in position by a tab 132 in the rotor key slot.

Oil grooves, ducts, and seals in bushings 106 and 107, axial apertures 67 partition 44, and reciprocators 45 and 60 direct the lubricant to load bearing surfaces, and the lubricant is circulated by a suitable pump in accordance with conventional practice.

A fuel or an air-fuel mixture may be burned in chambers 73 to heat the working fluid and to increase its momentum by using conventional internal combustion engine feul handling systems.

When a carburetor is attached to end wall 43 by bolts in threaded openings 86, spark plugs 133 are fastened in threaded openings 109 so they extend into passages 73 through the housing's central partition portion 44 and suitable ignition and fuel supply systems are added, the combination thus represented in FIG. 8 may be used as a spark-ignition internal combustion engine.

The operation of the mechanism shown in FIG. 8 is substantially the same as described in connection with the mechanism shown in FIG. 2, so that only a general description and the operation of the distinguishing features is believed necessary here. Reference may also be had to FIG. 9 which shows the parts of the engine in the same relative positions as in FIG. 3 and with the reciprocator removed and the ports of passages 70 and 73 represented by dotted lines on the face of a rotor, arrows C and E denoting the direction of movement of one group of compression or expansion ports with respect to one group of fixed ports.

The air-fuel mixture leaves the carburetor and is drawn into the compression section between the end surfaces of rotor 59 and reciprocator 60 as the reciprocator assembly moves axially and is then compressed in passages 73 as the rotor rotates to the position shown in FIG. 3. When the primary circuit of the ignition system is broken by the separation of suitable contact points (not shown), the resulting spark ignites the mixture and combustion takes place. Passages 74 in rotor 46 and passages 73 then begin to register as shown in FIG. 4 and the momentum of the gasses as they move between the end surfaces of rotor 46 and reciprocator 45 causes the residual gasses in passages 73 to expand and reduce the pressure. Passages 74 in rotor 59 and passages 73 then begin to register to admit pressurized air that pushes the remaining gas out of the passages 73. Passages 74 in rotor 46 and passages 73 are now out of register and the heated working fluid continues to expand and rotate the rotor until the position shown in FIG. 3 is reached. The reciprocator assembly is then moved axially and exhausts the used working fluid between the end surfaces of the expansion section and draws in fresh working fluid between the end surfaces of the compression section so that the cycle can be repeated.

It is believed apparent that fuel injectors might be mounted in threaded passages 109 to inject fuel directly into passages 73 and the housing's central portion 44, thereby converting the combination into a compression-ignition internal combustion engine. In such a construction, the fuel would be injected into the hot compressed air and burned in passages 73 starting at the time shown in FIG. 3. The fuel injectors might be actuated by cams attached to connecting elements 66 or by other suitable means.

It is also believed evident that if fuel lines were fastened in threaded passages 109 to connect with axially directed nozzles attached to suitable liners or flame holders added in passages 73, and if appropriate ignition, fuel injection, and fuel systems were added, the combination might be used as a continuous-combustion internal combustion engine. Fuel continuously injected in passages 73 would be mixed with compressed air from the compression section and burned. A spark plug communicating with cross-ignition passages and passages 73 would ignite the combustible mixture.

When a carburetor is used, a scavenging and cooling cycle is obtained by providing radial face grooves 89 half way between the passages 70 in end plate 79 to communicate with slots 90 in housing 41 and passages 70 in end plate 49, shown by dotted lines in FIG. 2. Any suitable gear train (not shown) may be provided to rotate plate 79 and make its angular velocity one half the angular velocity of shaft 54. Such an arrangement alternately connects each chamber between the end teeth of the compression ection to the air-fuel mixture in manifold 76 and the outside air. The outside air flows through slots 89 and is compressed in the usual manner, thereafter being forced outwardly through passages 73 when the ports are clear to scavenge the gasses and to cool the parts of the combustion chambers and expansion section. When periodic fuel injectors are used, a scavenging and cooling cycle may be obtained by injecting fuel every other cycle.

When end walls 42 and 43 are replaced by a suitable diffuser and exhaust nozzle respectively, the change in momentum of the working fluid may be used to produce reaction thrust for propulsion and the combination may then be used as a reaction engine. Should such a reaction engine be mounted near the center of gravity of a driven vehicle or craft, and should the vehicle or craft be free to move about this center, end plate 79 may be used to control the direction of the thrust by cutting off the working fluid supply to certain passages 73 while supplying it to others. This would produce an unbalanced torque about the center and the vehicle or craft would move accordingly. End plates 48, 49 and 79 may be omitted if passages 71 are moved to the position marked 88 and if the additional control and sealing provided by them is not required.

Figure 13:
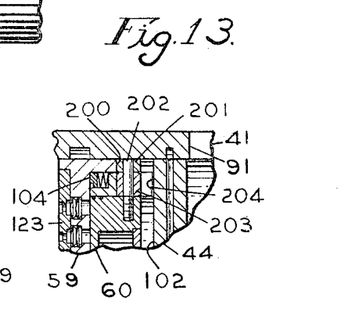
FIG. 13 is a fragmentary sectional view showing an alternative return means and seal assembly for use with the embodiment of FIG. 8.

FIG. 13 is a partial removed section showing an alternate return means for use with the embodiment shown in FIG. 8. The end teeth on cam 200 are substantially the same as teeth 61 on rotor 59 and bear against a plurality of rollers 201 that rotate about studs 202 rigidly fastened in reciprocator 60 by threads or other suitable means. The reciprocator thereby moves axially as the rotor rotates. Rollers 203 also rotate about studs 202 and are disposed in axial slots 204 in the transverse partition 44 to guide the axial movement of the reciprocator and to keep it from rotating in annular recesses 102.

Alternate seal assemblies 123 use individual bellows for each passage 71 instead of two large bellows and the annular plate is divided into four segmental plates. The bellows side and the end plate side of the ports in the segmental plates form pressure responsive surfaces and are proportioned so the surface on the bellows side is larger by a slight margin, in accordance with established pressure loading practice.

Figure 10:
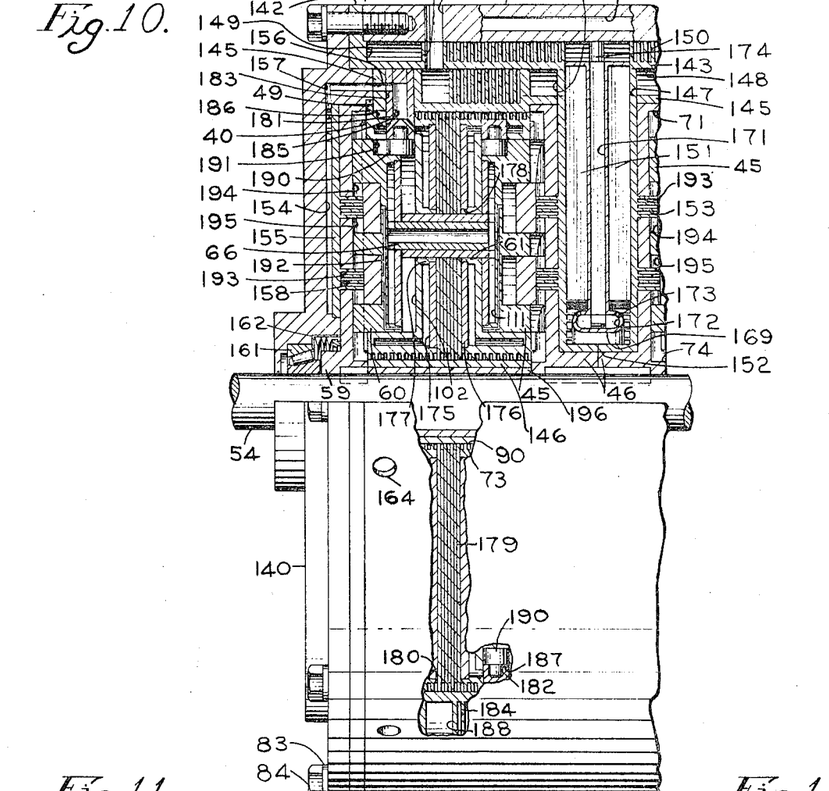
FIG. 10 is a longitudinal sectional view through a multiple stage, thermal, external combustion engine comprising a fourth embodiment of the present invention, certain members being revolved into the plane of the drawing for clarity of illustration.

In the form of the invention shown in FIG. 10, the main distinguishing features over the previously-described embodiments are external means of heating and cooling the working fluid between multiple stages of expansion and compression, an air and fuel preheater, a thermal storage device or regenerator for heating and cooling the working fluid as it passes between the compression and expansion sections, roller bearings to support the rotor and reciprocator assemblies, working fluid under pressure to help return reciprocators moving axially in opposite phase relation to each other, and a counterpressure sealing system to control the internal leakage and the output of the engine.

In the illustration of FIG. 10, it will be seen that two mechanisms are enclosed in an auxiliary sectional housing comprising left and right end sections 140 and 141, which are substantially disk shaped and are provided with extending bearing carriers and flange portions, left and right housing support sections 142 and 143, which are substantially cylindrical in shape and are each provided with an extending flange portion on one end and a disk portion on the other end, and a central generally cylindrical section 144 rigidly secured to the flange portions of the left and right end sections 140 and 141 and to left and right housing support sections 142 and 143 by bolts 83 and washers 84 or by other suitable means. Housing connecting members 145 and 146 of generally cylindrical shape join the two halves of housing 40 and regenerator 179 together, and the outer members 145 are held in bore 148 in the housing support sections by the flanges and axial pins (not shown) of end sections 140 and 141. The entire housing is arranged to form substantially working fluid-tight and coolant-tight enclosures and suitable sealing or packing means may be incorporated between the several sections thereof.

End sections 140 and 141 each has an annular coolant recess 154 in which an annular end back plate 155 is applied with an inference fit. The coolant recess communicates with a plurality of axial coolant passages 156 in the housing connecting member 145 through radial and axial passages 157. End back plate 155 has spiral fins 158 extending from one face with portions removed to form transfer passage ports 159 and 160 (FIG. 11). Annular recesses mount bearing assembly 161, seal assembly 162, and rotatable annular end plate 49.

Each of the housing support sections 142 and 143 has an annular manifold passage 149 located next to the flange portion that communicates with multiple spiral passages between spiral fins 150. A plurality of bosses 166 extend through recess 149 and radial exhaust passages 165 pass axially through such bosses. Radial fins 151 and collar 152 extend from one side of the disk portion, passages 147 pass through the disk portion, and spiral fins 153 extend from the other side of the disk portion and have portions removed to form transfer ports 159 and 160.

The central section 144 has a plurality of radial inlet passages 164 and exhaust passages 165 adjacent the ends thereof. A plurality of fuel line passages are disposed near the center of section 144. Threaded apertures are formed in the ends of the section to receive bolts 83 and a plurality of coolant passages 167 extend axially through the section.

Burner 169 includes two disk-shaped members each formed with a peripheral outer collar portion, a plurality of radial passages 171, half of a mixing chamber 172, and a plurality of orifices 173. The two disk-shaped members are welded or joined together by any other suitable means.

The housing 40 is enlarged and made in two sections. Three annular coolant recesses designated by the numeral 175 are formed in each section and an annular plate 176 is secured in each recess. Bores 61 pass through bosses 177 whose cylindrical end portions sealingly fit holes 178 in plate 176. Regenerator 179 is composed of a plurality of heat conducting annular plates having holes for connecting elements 66 and a central bore 90, and is insulated from and disposed between the two halves of housing 40. Spiral passages 73 and 180 are formed in the housing and generator with one spiral passage for each tooth of the rotor. A plurality of radial holes 183 extend through a finless annular recess 186 at one end of the housing and a plurality of holes 187 extend through the fins at the opposite end.

Housing connecting members 145 and 146 are applied to the two halves of the housing 40 and regenerator 179 to join them in one assembly. The outer housing connecting member 145 has a plurality of radial holes 183 formed in one end and communicating with axial passages 156. Annular recesses 188 and 189 communicate through a plurality of spiral passages between spiral fins 184.

Cylindrical bushings 181 and 182 have a sleeve portion on one end and are applied in housing 40 by means of an interference fit or by other suitable means. The bushings constitute journal and thrust bearings for rollers 190. Axial and radial passages 185 in bushing 181 communicate with passages 156 and annular recess 175 and their axial portion is closed by a suitable plug.

Each reciprocator assembly (reciprocators 45 and 60 and connecting elements 66) is modified in the following respects from the one shown in FIG. 8: the end surfaces are divided into three sections to provide three stages of compression and three stages of expansion; pressure equalizing passages 192 are added and lead from the removed annular sections to annular recesses 102; the axial roller slots 191 are formed in the peripheral surfaces of reciprocators 45 and 60. Rollers 190 have their larger cylindrical portions disposed in slots 191 and their smaller cylindrical portions in bushings 181 and 182. Such rollers support the reciprocators for axial movement and prevent them from rotating in annular recesses 102. Air spaces formed by coolant passages 111, along with other suitable passages and insulation between the various members of the assembly (not shown) limit the flow of heat from the expansion section to the compression section. Passages 116 would be threaded to receive suitable set screws to prevent axial movement of the tubular members of connecting elements 66.

Each rotor assembly (rotors 46 and 59 and shaft 54) is modified in the following respects from the assembly shown in FIG. 8: the end surfaces of the rotors are divided into three sections to match the end surfaces of the reciprocators; annular transfer passages 193 are formed in the opposite faces; radial portions of passages 74 are extended through the cylindrical walls on each side of the transfer passages as indicated by the numerals 194 and 195 and through the peripheral surfaces of the rotors where they are plugged. Below the plugs, passages 74 communicate with axial passages 71. The rotor assembly shown in FIG. 10 includes shaft 54 supported by suitable roller bearing assemblies 161 mounted in end sections 140 and 141. The rotor assembly also includes two expansion rotors secured to the center of shaft 54, two tubular spacers 196, and two compression rotors 59 sealingly secured to shaft 54 by suitable means.

In units where large heat transfer surfaces are necessary, the air and fuel preheating function of a radiator, and of fins 150, fins 184, and passages 187, the heat exchange function of the regenerator, and the heating and cooling of the working fluid, could all be accomplished in separate units in accordance with conventional practice.

A fuel or air-fuel mixture can be burned so heat will be transferred through a suitable heat conducting wall to increase the momentum of a working fluid on the other side of the wall by using conventional external burners and fuel handling systems. In the constructon shown in FIG. 10, a gas fuel would pass through a plurality of fuel lines 174 and be heated as it passes through alternate radial passages 171 to mixing chamber 172. Air would be preheated by passing through a radiator, guide ducts, spiral passages between fins 150, and alternate passages 171, to mixing chamber 172. The air-gas mixture would be burned after it leaves orifices 173. Consequently, fins 151 may absorb the heat and transfer it to internal fins 153 and to the working fluid around them. The products of combustion pass through passages 147, through the spiral passages between fins 184 and exhaust passages 165, and external ducts. Heat absorbed by fins 184 would be transferred to the incoming air and to regenerator 179.

The cooling means shown is similar in construction to the heating means and its internal cooling fins 158 remove heat from the working fluid around them and transfer such heat to a circulating coolant in contact with end back plate 155. Heat is also removed by the circulating coolant in annular recesses 175.

The operation of the mechanism shown in FIG. 10 is substantially the same as described in regard to the mechanism shown in FIG. 2 and, for that reason, only a general description of the operation, with specific emphasis on the operation of the distinguishing features, will be given here. In the operation of the FIG. 10 embodiment, a constant volume of working fluid follows a multiple stage closed cycle and is alternately heated and cooled in the heater and cooler described above. The relative movement of the moving and fixed passages is best seen in FIGS. 10 and 11. In FIG. 11, the parts of the mechanism are in the relative positions shown in FIG. 3 with the reciprocator removed and the parts of the rotor also removed to show passages 194 and 195 leading into and out of annular transfer passages 193. The ports of passages 73, 180, and 70 of the transverse partition 44 and of end plate 49 are represented by dotted lines on the face of the rotor, and arrows C and E denote the direction of rotation of one group of compression or expansion rotor ports, respectively, relative to one group of fixed ports. In FIG. 11, the working fluid is compressed in transfer passages 193 in the compression section and in passages 73, with all passages out of register. When passages 195 in the rotor register with ports 160, the compressed working fluid expands between the end teeth of the second and third compression stages and is cooled as it does work helping rotor 59 move the reciprocator assembly axially. This axial movement draws working fluid into the first compression stage through the regenerator passages 180 and rotor passages 71. When passages 160 and 195, passages 71 and 180, and passages 73 and 74 are out of register, the working fluid is first compressed between the end teeth until passages 159 and 194, and passages 73 and 74 shift into registry. In the first two stages, the working fluid is cooled as it is compressed about fins 158 in transfer passages 193, and in the last stage the working fluid is heated as it is compressed about the fins in passages 73, until the passages and parts return to the positions shown in FIG. 11. In the expansion section, as passages 73 and 74 and passages 159 and 194, begin to register the working fluid moves between the end teeth and forces the working faces apart. Passages 73 and 74, and passages 159 and 194, then pass out of register and the working fluid continues to expand as it forces the working faces farther apart. As passages 160 and 195, and passages 71 and 180, begin to register, the reciprocator moves axially and the working fluid in the first two stages is exhausted from the chambers between the end teeth and is compressed and heated about fins 153 in transfer passages 193. The working fluid in the last stage is moved through passages 71 into passages 180 in the regenerator 179 where heat is removed at constant volume and transferred to the working fluid in passages 73. The cycle is then repeated.

The construction shown in FIG. 10 can be used as a heat pump if burner 169 is removed and replaced by baffles to direct the gas or fluid to be cooled. Shaft 54 must of course be rotated by suitable driving means (not shown). The gas or fluid to be cooled would enter inlet passages 164, pass through the passages between spiral fins 150, then through passages 171, then through passages between fins 151, then through passages between spiral fins 184, and finally out through passages 165 where it can be used directly or circulated through a heat exchanger and returned to inlet passages 164. The fluid to be heated would circulate in the coolant passages previously mentioned.

The output of the engine can be controlled by varying the amount of working fluid flowing in the primary circuit between the end surfaces of the rotors and the reciprocators, and in passages 73 and 180. The amount of working fluid flowing in this primary circuit can be controlled by rotating the end plates 49 by flexible cables 196 passing out through suitable packings in the housing end sections or by controlling the output of a compressor connected in a secondary circuit made by connecting its inlet to a conduit leading to passage 180 and its output to a conduit leading to recesses 102. The pressure differential between these two circuits will determine the amount of the working fluid flowing in the primary circuit and flowing in and out of recesses 102 between the cylindrical surfaces of the rotors, the reciprocators, and the housing. If a compressor, such as the one described in regard to the mechanism shown in FIG. 2, is driven by shaft 54 and connected in the secondary circuit, the output of the compressor and the engine may be varied by rotating its end plate. Other compressors with suitable unloading inlet valves can also be used with certain constructions. This secondary circuit would also obviate the use of seals between the reciprocators and the surfaces in contact therewith and when equipped with a suitable pressure controller would balance the axial thrust of the working fluid on the reciprocators and can be used for these purposes on other forms of the invention.

Dynamic balance of the reciprocator assemblies is achieved by having them move in opposite phase relation to each other so the rate of change of momentum of each assembly is equal and oppositely directed. The resultant force due to the different rates of change of momentum of the hot and cold working fluid and members moving in opposite directions can be balanced or controlled by changing the amount of working fluid flowing in the primary circuits or directed by changing its path through the engine.

The external means of heating the working fluid shown in FIG. 10 can be combined with the internal means as shown in FIG. 8 to obtain more complete combustion and decrease hydrocarbon emissions. In this combination fins 153 would be kept above the autoignition temperature of the gases leaving passages 73 in FIG. 8 so the gases will burn as they pass over them.

While in the foregoing I have disclosed several embodiments of the invention in considerable detail for purposes of illustration, it will be understood by those skilled in the art that many of these details may be varied without departing from the spirit and scope of the invention.

I claim:

1. A mechanism comprising a housing, at least two pairs of members having cooperating end surfaces and being movably mounted in said housing, means confining a working fluid between the cooperating end surfaces of one pair of said members to form a relatively high pressure chamber and between the cooperating end surfaces of the other pair of said members to form a relatively low pressure chamber, means mounting said end-surfaced members for axial and rotational movement relative to each other along and about substantially coincident axes, and means controlling the momentum of said working fluid including passages between said chambers for conveying fluid from said relatively low pressure chamber to said relatively high pressure chamber.

2. The structure of claim 1 in which each pair of said members includes a rotatable member and a reciprocable member.

3. The structure of claim 2 in which said mechanism includes return means operatively associated with said reciprocable end-surfaced member of each pair of said members for moving the same axially.

4. The structure of claim 3 in which said return means includes at least two of said end-surfaced members.

5. The structure of claim 3 in which said return means includes a cam formed on one of said end-surfaced members engaging rollers operatively associated with another of said end-surfaced members.

6. The structure of claim 3 in which said return means includes working fluid under pressure in said passages connecting said high pressure chamber with said low pressure chamber.

7. The structure of claim 1 in which said momentum controlling means includes two sets of said passages connecting said high pressure chamber and said low pressure chamber, each of said sets of passages directing said working fluid in one direction about said axes and in opposite directions along said axes.

8. The structure of claim 7 in which means are provided for heating said working fluid in one of said sets of passages and for cooling said working fluid in the other of said sets of passages.

9. The structure of claim 1 in which said momentum controlling means includes working fluid passages in at least one of said end-surfaced members and in said housing, said housing including a plurality of end plates and a transverse partition, said working fluid passages being provided in at least one of said end plates and in said transverse partition and communicating with complementarily spaced working fluid passages in at least one of said rotatable end-surfaced members.

10. The structure of claim 9 in which at least one of said end plates is rotatable about the axis of said one of said rotatable end-surfaced members, adjusting means for locking said rotatable end plate in position, and means for rotating said one rotatable end plate about said axis.

11. The structure of claim 9 in which at least one of said end plates directs the flow of working fluid through selected axial passages in another of said end plates for selectively closing certain axial passages while leaving other axial passages open.

12. The structure of claim 9 in which at least one of said end plates has a section fixed relative to said housing and is also provided with a rotatable section, adjusting means for locking said rotatable section in position, and means for rotating said rotatable section.

13. The structure of claim 9 in which at least one of said end plates includes working fluid passages positioned and arranged for registration with an equal number of complementarily spaced working fluid passages in one of said rotatable end-surfaced members, additional working fluid passages between said end plate passages, means for rotating said end plate at one half the angular velocity of said rotatable end-surfaced member, and two groups of passages in said housing positioned and arranged for alternately communicating with said passages in said rotatable end plate and said passages in said rotatable end-surfaced member.

14. The structure of claim 2 in which said housing and each of said rotatable end-surfaced members are operatively associated with packing means to augment the confining of said working fluid between said end-surfaced members.

15. The structure of claim 2 in which said housing and each of said reciprocable end-surfaced members are operatively associated with packing means to augment the confining of said working fluid between said end-surfaced members.

16. The structure of claim 2 in which each of said rotatable end-surfaced members comprises a solid of revolution, end teeth formed on said solid of revolution, and working fluid passages communicating with spaces between said end-surfaced members.

17. The structure of claim 2 in which each of said rotatable end-surfaced members comprises a solid of revolution, multiple concentric sections of end teeth formed on said solid of revolution, and working fluid passages communicating with spaces formed between said end-surfaced members.

18. The structure of claim 2 in which each of said reciprocable members comprises a solid of revolution, end teeth formed on said solid of revolution, a connecting member, and means connecting said solid of revolution to said connecting member.

19. The structure of claim 2 in which each of said reciprocable end-surfaced members comprises a solid of revolution, multiple concentric sections of teeth formed on said solid of revolution, a connecting member, and means connecting said solid of revolution to said connecting member.

20. The structure of claim 2 in which means are provided for controlling movement of said reciprocable end-surfaced members for axial movement in opposite phase relation to each other.

21. The structure of claim 2 in which at least one of said reciprocable end-surfaced members is supported by a plurality of rollers disposed in slots provided in said mounting means.

22. The structure of claim 1 in which said momentum controlling means comprises working fluid passages in at least one of said end-surfaced members of each of said pair and in said housing means cooling said working fluid, and means heating said working fluid.

23. The structure of claim 22 in which said heating means includes means for mixing a combustible working fluid and means for igniting said combustible working fluid in combustion passages.

24. The structure of claim 22 in which said heating means comprises an external heat source and means for transferring heat from said source to said working fluid.

25. The structure of claim 22 in which said cooling means includes a coolant and means for transferring heat from said working fluid to said coolant.

26. The structure of claim 24 in which said heating means includes an external fuel burner, means for absorbing heat from the burning fuel and for transferring it to said working fluid, and a regenerator for removing heat from the expanded working fluid and for transferring said heat to the compressed working fluid.

27. The structure of claim 1 in which a plurality of said end-surfaced members are operatively connected in units to form multiple stages of operation.

28. The structure of claim 3 in which said return means counterbalances the axial force exerted by said working fluid on said reciprocable end-surfaced member of each pair of said members.

29. The structure of claim 1 in which said momentum controlling means includes an external power source for moving said end-surfaced members relative to each other and said working fluid associated therewith.

30. The structure of claim 29 in which a regenerator is provided by said mechanism for the circulation of working fluid therethrough and for removing heat from compressed working fluid and transferring said heat to expanded working fluid.

31. The structure of claim 3 in which said return means comprises an expansible means.

References Cited

UNITED STATES PATENTS

| | | | |
|---|---|---|---|
| 205,868 | 7/1878 | Huston et al. | 103—157 X |
| 1,686,767 | 10/1928 | Saxon | 123—14 |
| 2,896,590 | 7/1959 | Bush et al. | 91—58 |
| 3,129,669 | 4/1964 | Striegl | 103—157 |
| 3,136,255 | 6/1964 | Von Plato | 103—157 X |

CARROLL B. DORITY, JR., Primary Examiner

U.S. Cl. X.R.

91—58; 92—31; 103—157; 123—8